United States Patent [19]

Sodeikat

[11] Patent Number: 4,680,968

[45] Date of Patent: Jul. 21, 1987

[54] MECHANICAL VIBRATOR

[75] Inventor: Dieter Sodeikat, Baierbrunn, Fed. Rep. of Germany

[73] Assignee: Messerschmitt-Bölkow-Blohm GmbH, Munich, Fed. Rep. of Germany

[21] Appl. No.: 798,478

[22] Filed: Nov. 15, 1985

[30] Foreign Application Priority Data

Nov. 23, 1984 [DE] Fed. Rep. of Germany ....... 3442811

[51] Int. Cl.$^4$ .............................................. G01H 9/00
[52] U.S. Cl. ...................................................... 73/651
[58] Field of Search .................. 73/651, 652, 653, 654, 73/655, 579, DIG. 1; 250/231 R

[56] References Cited

U.S. PATENT DOCUMENTS 2,940,306  6/1960  Lozier ..................... 73/654
4,567,771  2/1986  Nelson et al. ............... 73/653

Primary Examiner—Stephen A. Kreitman
Attorney, Agent, or Firm—Kenyon & Kenyon

[57] ABSTRACT

A mechanical vibrator for resonance operation, and particularly well suited for use with a beam chopper, comprises a mechanically stiff vibrator arm representing a fixed mass. A spring with a fixed spring constant is attached to and acts upon the vibrator arm. The vibrator arm and the spring comprise a mass/spring system. A drive means is connected to the vibrator arm and has a positive feedback circuit for self-excitation at the resonance frequency of the mass/spring system. At least one first magnetic system is arranged on the vibrator arm and at least one second magnetic system is located off the vibrator arm in operational connection with the first magnetic system for measuring and/or influencing the time ratio of the two half waves ($t_o$, $t_g$) of the vibration amplitude waveform of the vibration arm.

9 Claims, 12 Drawing Figures

4,680,968

MECHANICAL VIBRATOR

FIELD OF INVENTION

This invention relates to a mechanical vibrator having resonance operation and which is especially suitable for use with a beam chopper. The vibrator has a mechanically stiff vibrator arm representing a fixed mass. A spring with a fixed spring constant and a drive means act on the vibrator arm. The drive means for the vibrator arm has a positive feedback circuit for self-excitation at the resonance frequency of the mass/spring system which comprises the vibrator arm and the spring. A measuring device determines the velocity or the position of the vibrator arm.

BACKGROUND OF THE INVENTION

A mechanical vibrator of the general above-described type is disclosed in German Patent Application No. P 34 22 005.4-35 in connection with a method and apparatus for the derivation of a course deviation signal for an earth satellite in orbit by means of an earth horizon sensor. DE-OS No. 20 35 314 discloses another satellite-related application for such a beam chopper used in an infrared telescope which operates with cooled infrared sensors. Since these sensors only deliver signals in the microvolt range and such small d-c signals can be amplified only with difficulty, it is necessary to chop the signal. Such chopping is advantageously accomplished by chopping the incident radiation by means of a beam chopper. This chopping must be accomplished completely uniformly, i.e., the times during which the radiation strikes the infrared detector must be exactly as long as the respective dark phases. A secondary-mirror tilting device serving similar purposes for a mirror telescope is known, for example, from DE-OS No. 32 13 076.

Due to the small power loss required in satellite applications, such beam choppers are operated at resonance, i.e., at the resonance frequency of a mass/spring system.

OBJECTS OF THE INVENTION

It is an object of the present invention to provide a mechanical vibrator especially suitable for a beam chopper which meets the above-mentioned requirements and in addition has a variable period, and in particular, an asymmetrical vibration waveform.

With such a mechanical vibrator, it is possible to match, for instance, the bright and dark phases of a beam chopper to each other, which is not possible with a symmetrical vibration waveform when different size beam diameters are to be blanked out and chopper apertures are used for this purpose.

SUMMARY OF THE INVENTION

The present invention comprises a mechanical vibrator for resonance operation with a beam chopper. The vibrator comprises a mechanically stiff vibrator arm representing a fixed mass and a spring having a fixed spring constant is attached to and acts upon the vibrator arm. The vibrator arm and the spring comprise a mass/spring system. Drive means vibrate the vibrator arm with an amplitude waveform having a periodic time and having a first and a second half-wave. The drive means includes a positive feedback circuit control means for self-excitation at the resonance frequency of the mass/spring system. Measuring device means are provided for determining the velocity or the position of the vibrator arm. At least one first magnetic system is arranged on the vibrator arm and at least one second magnetic system is arranged off the vibrator arm in operating connection with the first magnetic system for influencing the time ratio of the two half-waves (tg, to) and/or the vibration frequency of the vibrator arm.

DETAILED DESCRIPTION OF THE INVENTION

Figure 1:
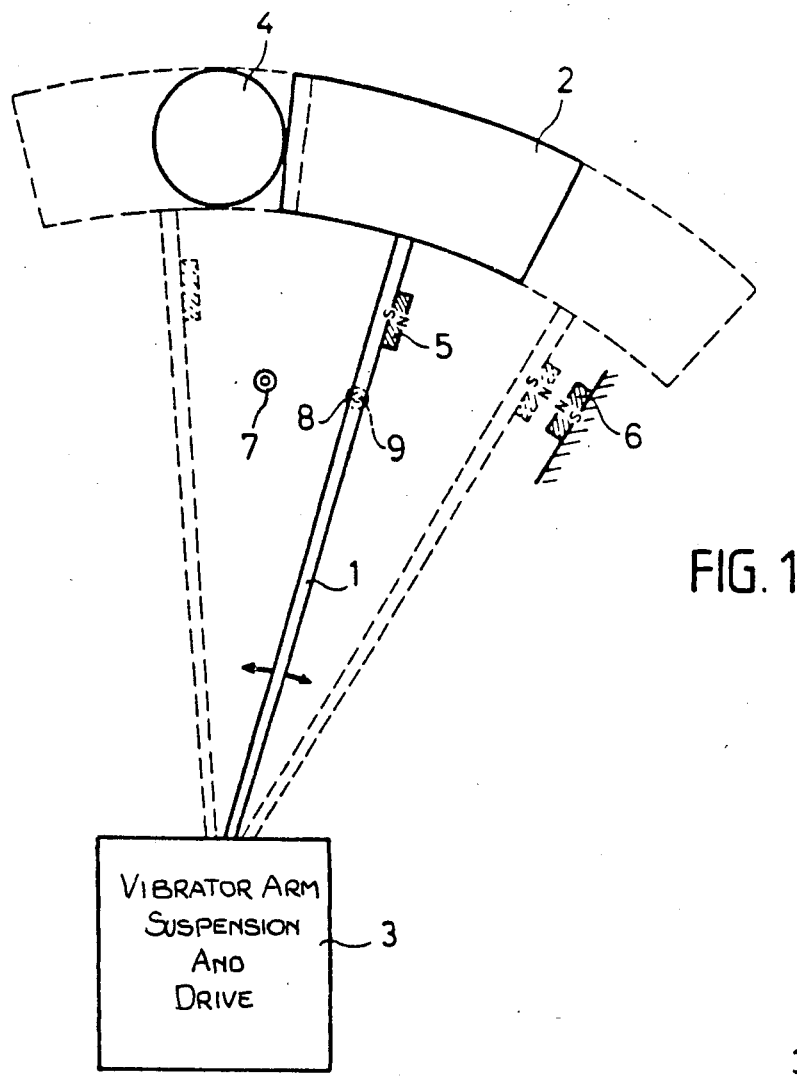
FIG. 1 schematically illustrates a mechanical vibrator in accordance with the invention used as a beam chopper.

As schematically illustrated in FIG. 1, a mechanical vibrator in accordance with the present invention is designed as a beam chopper and comprises for this purpose a mechanically stiff vibrator arm 1 at the free swinging end of which is arranged an aperture means 2. The suspension and drive of the vibrator arm 1 are designated schematically as 3. Suitable embodiments of suspension and drive arrangements are hereinafter described. The beam chopper is arranged in the ray path 4 of an optical or opto-electrical device in such a manner that for one half-wave of the vibration amplitude waveform, the beam diameter 4 is completely released and during the other half-wave is completely covered up.

Figure 2A:
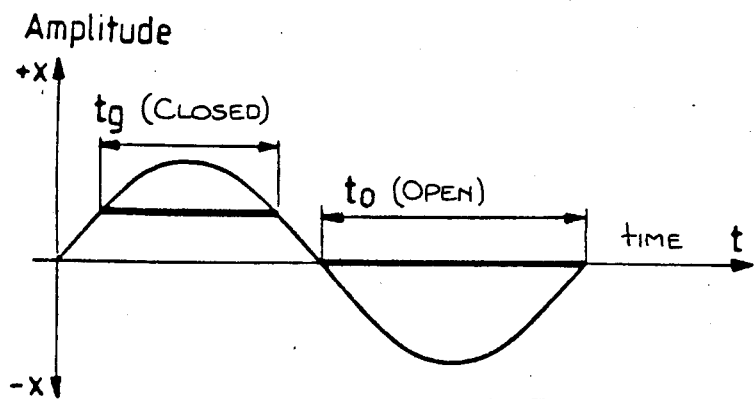
FIGS. 2a and 2b illustrate the amplitude waveform of the aperture of a beam chopper with a linear spring characteristic.
Figure 2B:
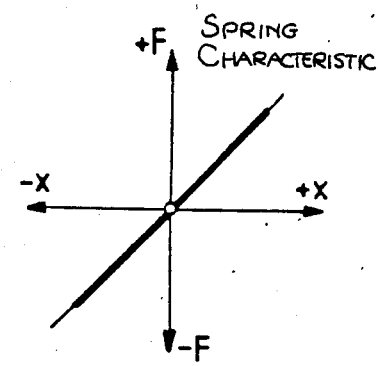

In the case of a beam chopper vibrating at resonance with a pure sine wave and a vibration amplitude of twice the beam diameter, the amplitude waveform of the beam chopper aperture would have the form illustrated in FIG. 2a. It is assumed here that the spring which is provided in the drive and acts on the axis of rotation of the vibrator arm has a linear characteristic according to FIG. 2b. Due to the desired times, which are as long as possible, in which the ray path is completely free or completely closed, and the different sizes of the chopper aperture and the beam diameter connected therewith, the times of complete opening are always longer for a pure sine wave than the times of complete closure.

Figure 3A:
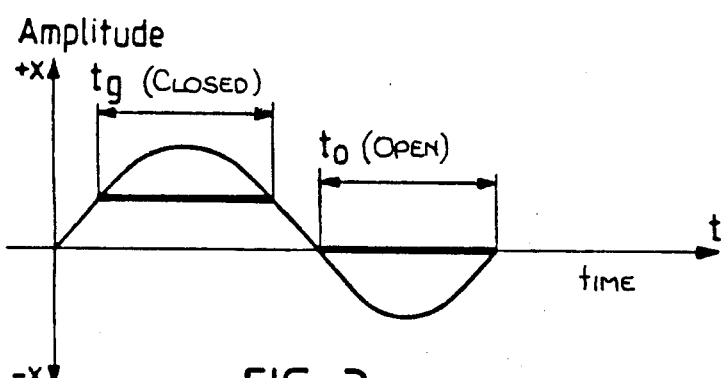
FIGS. 3a and 3b illustrate the amplitude waveform of the beam chopper aperture wherein the spring characteristic is influenced in accordance with the present invention.
Figure 3B:
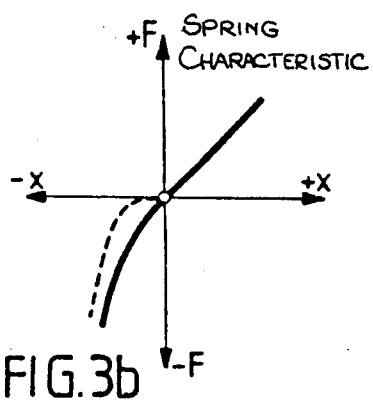

In accordance with the invention, a first permanent magnet 5 is arranged on the vibrator arm 1 of the beam chopper and a second magnet 6 located on a housing part opposite this magnet 5 at the maximum pendulum excursion. Magnet 6 is arranged in such a manner that a repelling force is exerted on the magnet 5 in the vicinity of the end of the pendulum excursion. This repelling magnetic force can be equated to a change of the spring characteristic as illustrated in FIG. 3b and depends on the distance and strength of the magnets 5 and 6. The non-linear range of the spring characteristic can be changed for the half-wave during which the beam diameter is released and which is indicated by the dashed spring characteristic. A spring characteristic changed in this manner has an effect on the vibration waveform of the chopper aperture so that the half-wave releasing the beam diameter is shortened in time.

Appropriate adjustment of the magnets 5 and 6 can result in the times $t_g$ (times during which the ray path 4 is completely closed) and the times $t_o$ (times during which the ray path is completely open) are of the same length.

FIG. 2a illustrates a sine wave amplitude wave form where the spring constant is linear. The time $t_o$ (completely open) is greater than the time $t_g$ (completely closed). FIG. 3a illustrates the amplitude wave form, in accordance with the invention, where the spring constant is effectively made non-linear by the repelling maqnetic forces. The amplitude wave form is altered so that the half-wave times are not equal. Time $t_o$ (completely open) is made equal to time $t_g$ (completely closed) by adjusting the respective half-wave times through use of the repelling magnetic forces in accordance with the invention.

These times $t_o$, $t_g$, can be checked, for example, by locating parallel to the plane of the beam chopper, two induction coils 7 and 8 which the vibrator arm 1 having a further permanent magnet 9 fastened thereto passes. In the process of passing coils 7, 8, the magnet 9 induces a voltage pulse in coils 7 and 8. The coils 7, 8 are positioned so that a voltage pulse is generated at each beginning and at each end of the "open" or "closed" phase. That is, coils 7 and 8 are located to indicate that the position of the vibrator arm 1, and hence aperture 2, is the position of the beginning or end of an open or closed phase. In instances where the ratio of beam diameter and vibration amplitude is small, only one correspondingly arranged coil is sufficient for determining the position of the vibrator arm.

Figure 5:
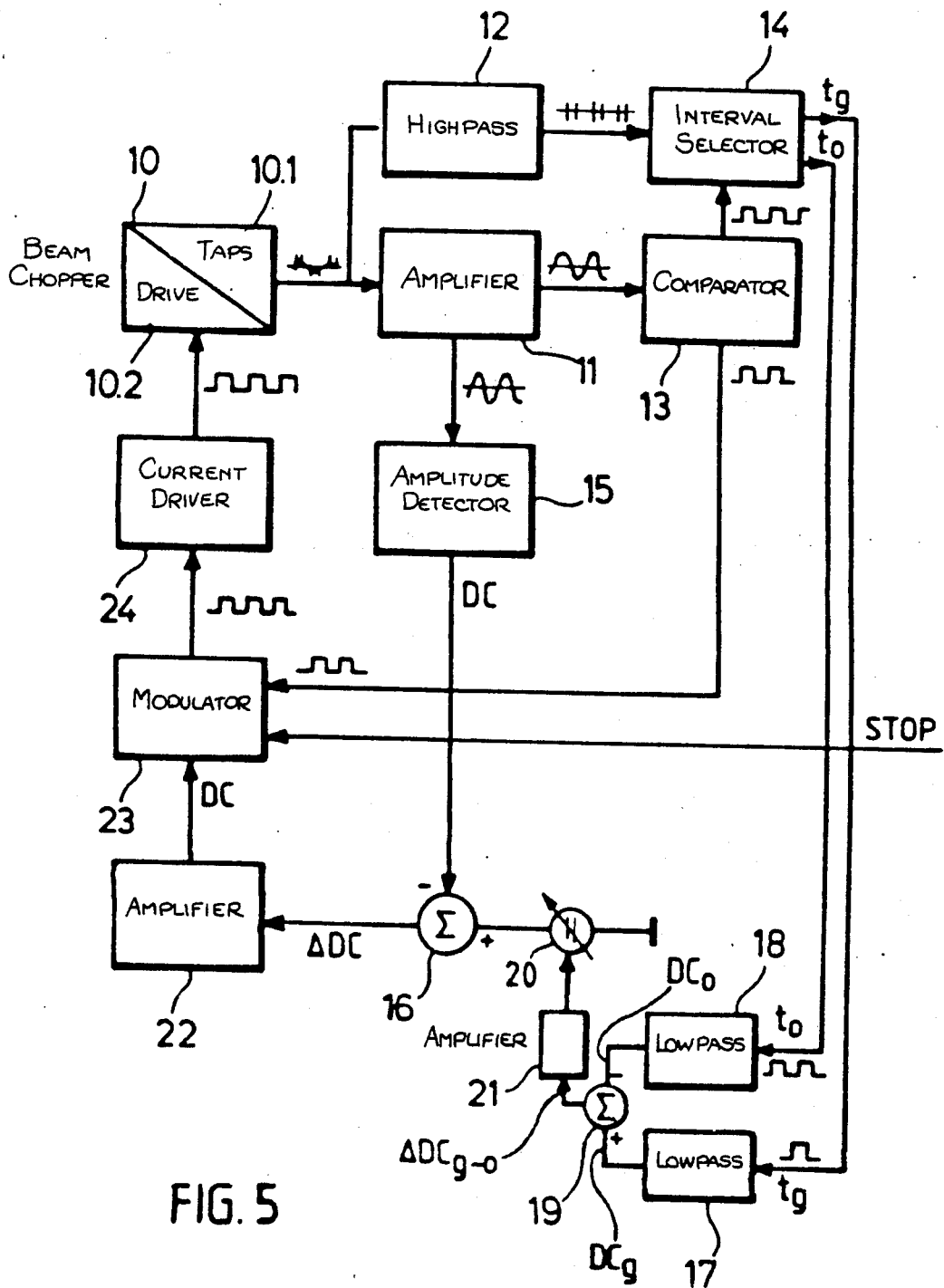
FIG. 5 illustrates a control circuit for the drive of a mechanical vibrator according to FIGS. 1 or 4.
Figure 6A:
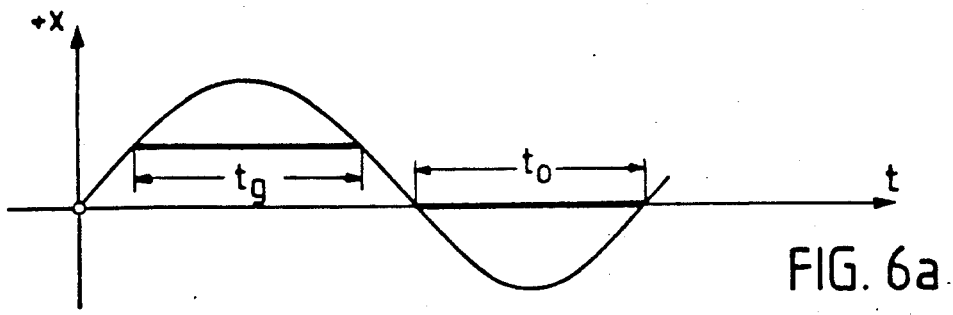
FIGS. 6a to d illustrate the signal waveform at some characteristic places of the control current according to FIG. 5.
Figure 6B:
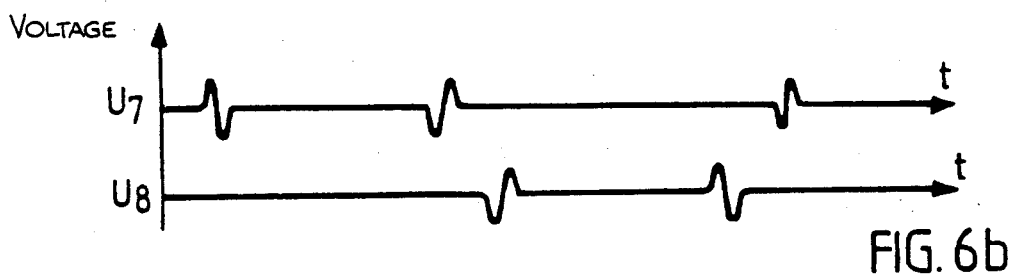
Figure 6C:
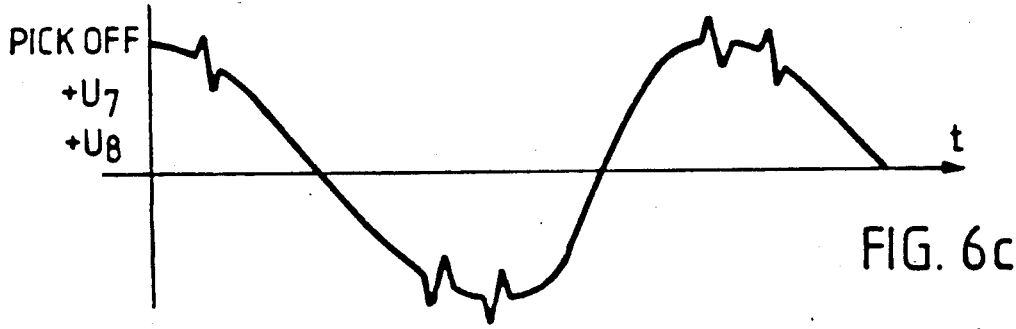
Figure 6D:
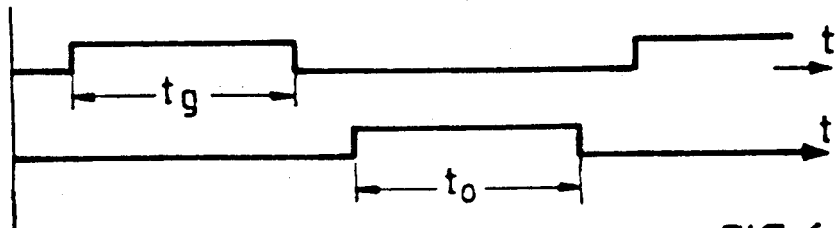

The voltage waveforms $U_7$ and $U_8$ in the coils 7 and 8 are shown in FIG. 6b, which corresponds to the situation illustrated in FIG. 3a. The embodiment of FIG. 3a is illustrated once again as FIG. 6a for purposes of easy comparison. A voltage waveform corresponding to the waveform of FIG. 6a is generated by a further position transducer provided in the drive 3 wherein this so-called pick-off signal of FIG. 6c is used in a positive-feedback circuit, hereinafter described in conjunction with FIG. 5, for the self-excitation at the resonance frequency.

In the instances where the vibration frequency of the vibrator arm is to be changed instead of influencing the time ratio of the two half-waves, a further arrangement comprising a further first and a further second magnet system (similar to the magnetic stop arrangement 5, 6 illustrated in FIG. 1) can also be arranged on the other side of the vibrator arm 1, whereby two magnetic stops for the vibrating arm 1 are created. This achieves the result that the amplitude on both sides of the half-waves is nearly constant from a minimum drive energy on. The vibration frequency can furthermore be varied by increasing the energy fed to the drive 3; the vibration energy is substantially proportional to the fed-in energy as long as the vibrator arm does not encounter a mechanical stop. In this manner a chopper operating at resonance is produced, the vibrating frequency of which can be varied electrically in a simple manner.

A circuit for excitation at the resonance frequency is illustrated in FIG. 5. The pick-off signal (FIG. 6c) superimposed on the voltage peaks of the coils 7 and 8 of the beam chopper, designated as a whole as 10, is fed from the taps 10.1 to an amplifier 11 with a lowpass characteristic for the amplification proper of the pick-off signal, as well as to a highpass 12 for selecting the voltage pulses of the coils 7 and 8. Such a superposition of the signals from the coils 7 and 8 with the pick-off signal is advantageous particularly if only a small number of measuring lines is either available or, for instance, when cryostat operation is to be used. If such a signal superposition is not necessary, the electronic circuitry (11, 12) for separating the two signals can be omitted. The amplitude-proportional pick-off signal is digitalized in a comparator 13. By means of this digitalized signal from the comparator 13, the two times $t_g$ and $t_o$ for the closed and open state are determined in an interval selector 14. The signals for $t_g$ and $t_o$ provided at the output of the interval selector 14 are illustrated in FIG. 6b. From the amplified pick-off signal provided at the output of amplifier 11, an amplitude detector 15 generates a d-c voltage DC proportional to the chopper amplitude. This d-c voltage is fed to a summing amplifier 16 as the actual value. The corresponding amplitude reference value is generated by feeding the signals for $t_g$ and $t_o$ to a lowpass 17 and 18, respectively, and converting them into time-proportional d-c voltages $DC_g$ and $DC_o$. A following summing amplifier 19 forms the difference delta $DC_{g-o}$ of the two signals $DC_g$ and $DC_0$. This difference signal delta $DC_{g-o}$ controls an actual-value setter 20 of the chopper amplitudes via a PI amplifier 21 in such a manner that the ratio of the times $t_g$ and $t_o$ reaches the value 1. For this purpose the actual amplitude value is compared in the summing amplifier 16 with the reference value generated as described above. The difference delta DC is amplified in a PI amplifier 22 and is modulated in a modulator 23 by means of the digitalized pick-off signal with a phase rigid relative to the chopper amplitude. A current driver 24 converts the modulated signal into corresponding current pulses for the chopper drive 10.2 whereby the control loop is closed.

Figure 4:
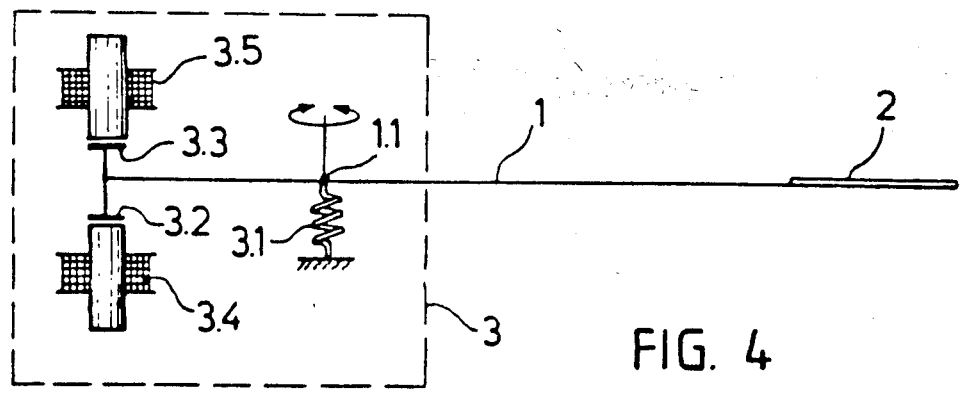
FIG. 4 schematically illustrates a mechanical vibrator in accordance with the present invention used as a beam chopper.

In FIG. 4, a beam chopper according to FIG. 1 is illustrated in a side view, the components of the drive being schematically shown. A spiral spring 3.1 operates at the pivot 1.1 of the vibrator arm 1, so that a vibrating mass/spring system with a given resonance frequency is produced. At the end of the vibrator arm opposite the aperture 2, two vibrating armatures 3.2 and 3.3 are arranged which are in operating connection with a corresponding position transmitter coil 3.4 or the drive coil 3.5, respectively.

Figure 7:
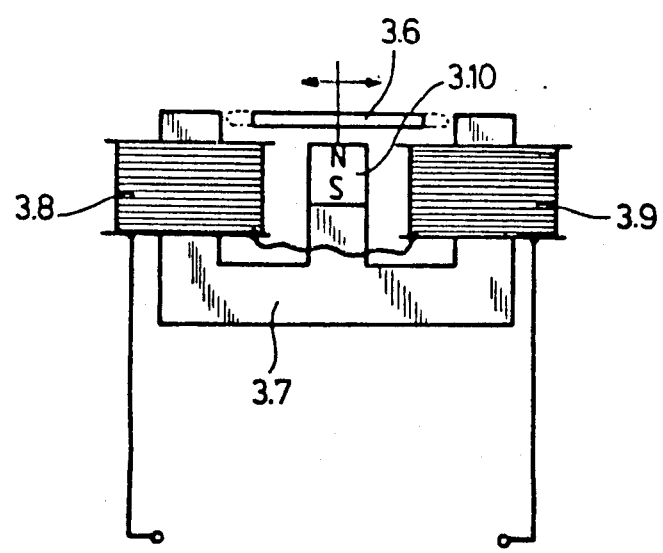
FIG. 7 schematically illustrates a combined drive and amplitude sensor for a mechanical vibrator in accordance with the present invention.

In FIG. 7, a drive combined with an amplitude sensor is shown. Here, only one vibrating armature 3.6 is arranged which is fastened to the vibrator arm, not shown, and which vibrates between two coils 3.8 and 3.9 connected via a yoke 3.7. Between the coils 3.8 and 3.9 there is a permanent magnet 3.10 over which the vibrating armature 3.6 passes in immediate proximity. In this manner, voltage pulses are generated in the series-connected coils 3.8 and 3.9 which can be filtered out as amplitude signals. The coils 3.8 and 3.9 serve at the same time as driving coils for the vibrating armature 3.6. In this embodiment, the coils are operated advantageously from a variable current source with a square-wave shape.

Although preferred embodiments of the present invention have been described in detail, it is contemplated that modifications may be made by one skilled in the art, all within the spirit and the scope of the present invention as defined in the claims.

What is claimed is:

1. In a mechanical vibrator for resonance operation with a beam chopper comprising:
    a mechanically stiff vibrator arm representing a fixed mass, a spring having a fixed spring constant attached to and acting upon said vibrator arm wherein the vibrator arm and the spring comprise a mass/spring system having a resonance frequency,
    drive means for vibrating said vibrator arm with an amplitude waveform having a first half-wave and second half-wave, said drive means including positive feedback circuit control means for self excitation at the resonance frequency of the mass/spring system, and
    measuring device means for determining the velocity or the position of the vibrator arm,
    the improvement comprising:
    means for influencing the ratio of the time of the first and second half waves and/or the vibration frequency of the vibrator arm, said means comprising at least one first magnetic system located on the vibrator arm and at least one second magnetic system located off the vibrator arm which is in operational connection with the first magnetic system.

2. A mechanical vibrator according to claim 1 wherein said first magnetic system comprises a permanent magnet arranged on the vibrator arm and said second magnetic system comprises a second magnet located off the vibrating arm at a position whereby it generates during one half-wave of the vibrator arm a repelling force acting upon the first permanent magnet.

3. A mechanical vibrator according to claim 2 wherein said second magnetic system further comprises an additional magnetic system located off the vibrator arm at a position which generates at the other half-wave of the vibrator arm a repelling force acting on the permanent magnet on the vibrator arm.

4. A mechanical vibrator according to claim 1 wherein the measuring device means for determining the position of the vibrator arm comprises a permanent magnetic located on the vibrator arm and two induction coil means arranged parallel to the plane of vibration of the vibrator arm for generating two position signals of the vibrator arm during each vibration period of the vibrator arm.

5. A mechanical vibrator according to claim 2 wherein the measuring device means for determining the position of the vibrator arm comprises an additional permanent magnet located on the vibrator arm and two induction coil means arranged parallel to the plane of vibration of the vibrator arm doing for generating two position signals of the vibrator arm during each vibration period of the vibrator arm.

6. A mechanical vibrator according to claim 3 wherein the measuring device means for determining the position of the vibrator arm comprises an additional permanent magnet located on the vibrator arm and two induction coil means arranged parallel to the plane of vibration of the vibrator arm for generating two position signals of the vibrator arm each vibration period of the vibrator arm.

7. A mechanical vibrator according to claim 4 wherein said position signals are fed to the feedback circuit control means for controlling the ratio of the time of the first and second half-waves of the vibrator arm.

8. A mechanical vibrator according to claim 5 wherein said position signals are fed to the feedback circuit control means for controlling the ratio of the time of the first and second half-waves of the vibrator arm.

9. A mechanical vibrator according to claim 6 wherein said position signals are fed to the feedback circuit control means for controlling the ratio of the time of the first and second half waves of the vibrator arm.

* * * * *